April 25, 1967   J. H. ANDERSON   3,315,466
VAPORIZED FLUID POWER SYSTEM
Filed Aug. 5, 1965
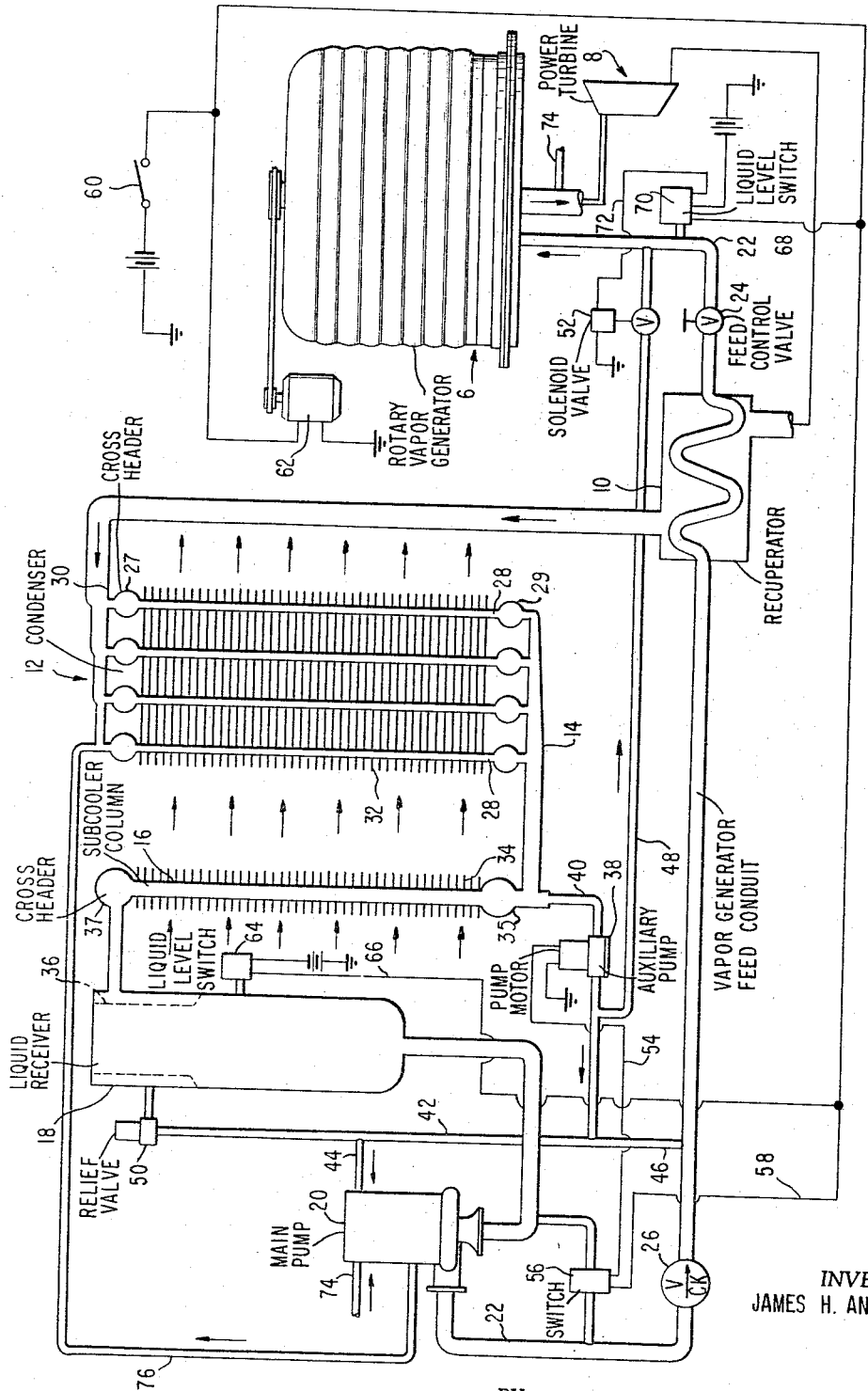
INVENTOR
JAMES H. ANDERSON
ATTORNEYS

United States Patent Office 3,315,466
Patented Apr. 25, 1967

3,315,466
VAPORIZED FLUID POWER SYSTEM
James H. Anderson, 1615 Hillock Lane,
York, Pa. 17403
Filed Aug. 5, 1965, Ser. No. 477,402
5 Claims. (Cl. 60—36)

This invention relates generally to a vaporized fluid power system and more particularly to a fluid condenser adapted for use in such a system.

The condenser embodied in this invention is intended for, but not limited to, use with power systems of the type disclosed in applicant's copending application Ser. No. 373,661, filed June 9, 1964, and entitled, "Vehicular Power Plant." In the system disclosed in that application, a halocarbon boiling fluid is vaporized and is used as a motivating fluid in a closed system fluid turbine. The power plant of that disclosure is further intended for uses which include mobile vehicular power plants. This intended use requires a compact arrangement thereby imposing certain dimensional restrictions on the overall system size.

The above-mentioned dimensional restrictions impose certain problems with respect to transmission of the fluid. In the system disclosed in the above-mentioned application, exhaust fluid, in a vapor state, is passed through a condenser section for condensation thereof and then is delivered in a liquid state to a main pump, such as the centrifugal pump disclosed in applicant's copending application Ser. No. 427,369, filed Jan. 22, 1965. The power plant being intended for use in vehicles, is thus subject to restrictions in size, particularly as regards height. This imposes certain problems in connection with the pumping requirements as they must be kept to a minimum to maintain system efficiency. One of the difficulties is to maintain a pressure head on the low pressure side of the pump without return pumping which is sufficient to avoid cavitation and vapor flash of the fluid at the pump intake. Without some special provisions or additional pumping requirements, the prior art condenser systems would be unable to provide the required static pressure head in the confines of the geometry required by automotive vehicles.

Another problem involving power plant systems of the above-described type is liquid migration during system shutdown. As is more specifically described in the aforesaid power plant application, the system is designed for perpetual energization, so that, through the use of a pilot light heat source and suitable insulation, it has been found possible, even during long periods of shutdown, to maintain the system in an energized state ready for instant operation. During the shutdown, however, the power plant system will develop a substantially equal vapor saturation pressure throughout and liquid will therefore tend to migrate to the coolest portion thereof. Although, as described more fully in the aforementioned application, seals are provided to block this migratory flow. If the system is to be maintained in a state of constant readiness, as is particularly required in automotive power plants, some compensation must be made for migration of the system liquid to the coolest portions thereof.

It is therefore an object of this invention to provide a condenser system for the above-described power plant which overcomes both the particular problems presented by that power plant and the disadvantages of prior art fluid condensers.

It is also an object of this invention to furnish a fluid condenser system and pump for a vaporized fluid power plant which:

(1) Is suitable for use in situations requiring compactness in height and therefore a low static head condition by provision of a "thermal pump" replenished reservoir on the low pressure side of the mechanical pump, the reservoir being configured and disposed to furnish a static head suitable to prevent fluid cavitation in the system pump;

(2) Maintains proper fluid phase distribution throughout the system when shut down by providing means to sense conditions in selected portions of the system and means to pump liquid to these portions when conditions so require;

(3) Pumps a liquid against a normally adverse static head gradient by arranging a condenser with a cooling airflow therethrough so that a temperature gradient is produced in the liquid which furnishes a pressure gradient sufficient to overcome the adverse static head gradient so that the liquid is "self" pumped into the adverse gradient;

(4) Provides a novel compensating device for a fluid system, which is subject to fluid migration according to localized temperature conditions during shutdown, by furnishing an auxiliary pump, a sensing system and a fluid distributing system for delivering liquid to selected portions of the system when conditions so require.

These and other objects of the invention will become better understood by reference to the following detailed description when considered in light of the accompanying drawing:

The lone drawing figure is a schematic representation of a device in accordance with the invention.

Referring now to the drawing, a device in accordance with this invention is incorporated in a fluid system which includes a rotary vapor generator 6 of a type described in greater detail in applicant's copending application Ser. No. 402,993, filed Oct. 12, 1964, now Patent 3,260,050, dated July 12, 1966. The output of this generator is connected to a power turbine 8 for extraction of mechanical energy from the vapor output of the generator by expansion thereof. The exhaust from the turbine 8 is directed through a recuperator 10 from whence it is transmitted to the top of a condenser shown generally at 12. The output of the condenser is accumulated in a manifold 14 disposed at the bottom thereof and, from there, transmitted to the bottom of a subcooler column 16. The fluid from the subcooler column 16 is taken off at the top end thereof and transmitted to a liquid receiver 18 from whence it is fed to a main pump 20. The main pump is preferably of the centrifugal type described in greater detail in applicant's above-mentioned copending application Ser. No. 427,369. From the pump, liquid is directed through a vapor generator feed conduit 22, the recuperator 10 and a vapor generator feed control valve 24 to the vapor generator 6. A check valve 26 is provided in the feed line 22 to prevent backflow in the line 22 during a portion of the operating cycle of the system to be described in greater detail below.

The condenser 12 consists of a series of vertical tubes 28 connected at the top ends thereof to a distributing manifold 30 and at the bottom ends thereof to the collecting manifold 14. Condenser cross headers 27 and 29 intersect each condenser tube 28 to provide connection to additional banks of condenser tubes (not shown). Fins 32 are disposed around and between each of the tubes 28 to provide increased heat transfer area in the conventional manner. The subcooler tube 16 is similarly provided with fins 34 and crossheaders 35 and 37 for the same purposes as that described above for the condenser crossheaders. An annular screen 36 is provided around the top inner periphery of the receiver 18 to prevent splashing and stirring of the liquid as it enters from the subcooler 16 or from other sources to be described later.

The specific relationship between the number and diameter of condenser tubes with respect to the subcooler tubes is not critical but must primarily be decided by the total amount of heat to be transferred to the air and in the amount of subcooling below saturation temperature required for the particular design and fluid used. Generally speaking, more area will be required in the condenser than in the subcooler. The drawing represents a section taken through the condenser and subcooler and shows four complete rows of condenser tubes 28 and one row of subcooler columns 16. The subcooler columns are somewhat larger in diameter than the condenser tubes because it is desirable to have a fairly low velocity through the subcooler whereas a fairly high velocity down through the condenser tubes can be tolerated. The temperature of the condenser vapor is almost constant at all points down through the condenser but the temperature reduces in the liquid as it travels more slowly up through the subcooler. It should also be understood that the actual size of the tubes and the total area required will vary with the particular fluid being condensed since some fluids have much higher latent heats of vaporization than others.

Since substantial subcooling is accomplished in this system, the height relationship of the various units is not quite as critical as would be the case if a minimum of subcooling were done. It is important, however, that the main pump 20 be located below the level of the receiver 18 and that an auxiliary pump 38 be disposed as far as practical below the condenser manifold 14. It would also be desirable to have the upper portions of the subcooler 16 and receiver 18 below the upper level of the inlet to the condenser 12 so that reverse flow of liquid back through the distributing manifold 30 would be prohibited when there is no gas flow through the turbine 8. Although shown otherwise in the drawings, it may also be desirable to locate the recuperator 10 above the condenser 12 to again avoid liquid backup in the recuperator during periods of shutdown. Neither of the latter two mentioned relationships are absolutely necessary, however, since the exhaust pressure from the turbine 8 is always capable of blowing trapped liquid through the recuperator into the condensing system when the system is energized.

In operation of the condenser system, the exhaust gas from the turbine 8 flows through the recuperator 10 and into the distributing manifold 30 from whence it is distributed into individual tubes 28 in the condenser 12. Cooling air flows over the subcooler column 16 and the tubes 28 in the direction indicated by the arrows of the figure. This cooling air removes heat from the vapor entering from the distributing manifold 30 so that by the time the fluid reaches the lower portion of the tubes 28 it is condensed and flows as a liquid into the collecting manifold 14. The liquid then flows up the subcooler column 16 for subcooling, below a temperature equivalent to saturation pressure for the fluid, and up into the receiver 18 where it collects to form a static pressure head or level of liquid above the main pump 20. This static head and the subcooling of the liquid below saturation temperature serves to force the liquid into the main pump intake at a pressure and temperature sufficient to avoid cavitation of the fluid and flashing into gas in the pump inlet. A "thermal" or temperature differential pumping effect is achieved in the arrangement of the subcooler column 16 and the tubes 28, in that the coolest air is first passed over the subcooler column and then over the condenser tubes. This provides a condensing pressure higher than the saturation pressure in the liquid subcooler thereby providing a pressure differential serving to lift the liquid into the liquid receiver. As an example, if a fluorocarbon, Freon 114, which is the trademark name for Dichlorotetrafluoroethane $CClF_2CClF_2$ fluorocarbon, is used as a boiler fluid, the condensing pressure, at a condensing temperature 130° F., is 73.5 lbs. per square inch in the condenser. If the liquid is subcooled to 120° F. the saturation pressure is 63.4 lbs. per square inch in the subcooler. The resulting pressure differential between the two points is therefore ample to lift the condensed liquid through the subcooler column 16 into the receiver 18.

It should be understood that, in the above-described system, halocarbons or any other type of fluid suitable for the purpose could be utilized as the working fluid for the system. For example, if it were not for the flammable danger of hydrocarbons, this type of compound would be even better suited for use in the system than halocarbons. As an example, propane would provide a much more efficient cycle and could operate at much higher temperature than any of the halocarbons.

During normal operation, the fluid is pumped through the main pump 20, conduit 22, check valve 26, recuperator 10 into the vapor generator 6 for vaporization thereof from whence it is exhausted into the turbine 8 and returned through the recuperator 10 for recondensation in the condenser 12.

When the system is shut down, the liquid settles to a level determined by gravity rather than by pump forces in the system and although the vapor generator feed control valve 24 is closed, leakage of liqiud past this valve as well as other valves of the circuit may eventually occur. To provide for this eventuality, particularly during long periods of shutdown, and to maintain the system in a constant state of readiness for use, a compensating or recirculating system is incorporated in the condenser system of this invention to correct or counter any migration incurred during periods of shutdown. This compensating system operates around a standby or auxiliary feed pump 38 which may comprise a small positive displacement motor driven pump having sufficient capacity to pump liqiud from the collector manifold 14 into the rotary vapor generator 6 or into the receiver 18. The pump is positioned in a bypass circuit between the manifold 14 and receiver 18 which comprises a conduit 40 and a standpipe 42, that is connected to the main pump 20 and vapor generator feed line 22 through branch conduits 44 and 46 respectively. The auxiliary pump 38 is also connected to the vapor generator feed conduit 22 on the vapor generator side of the recuperator 10 by a second bypass conduit 48. A normally closed relief valve 50 is disposed in the standpipe 42 proximate the axis thereof into the receiver 18 while a normally closed solenoid valve 52 is disposed in the conduit 48 to control flow therethrough. The auxiliary feed pump 38 is connected to a source of electrical energy through an electrical conductor 54, a pressure differential switch 56 (suitably disposed to sense pressure differential between the inlet and outlet of the main pump 20) and through a conductor 58 and ignition switch 60. A rotary vapor generator motor 62, the function of which is more fully described in applicant's above-mentioned copending application Ser. No. 402,993, is also connected to the source of electrical energy through the ignition switch 60. The differential pressure switch 56 is normally closed when there is an absence of pressure differential between the sources sensed.

A liquid level switch 64, mounted in the liquid receiver 18, connects the auxiliary feed pump 38 to a source of electrical energy through a conductor 66. The liquid level switch is of any type conventional in the art and is normally closed when there is an absence of liquid at the point monitored.

The auxiliary pump 38 is connected to a source of electrical energy by still another conductor 68 and a liquid level switch 70 mounted in the vapor generator feed line 22 proximate the entrance to the vapor generator. The feed switch 70 also connects solenoid valve 52 to a source of electrical energy through a conductor 72; in a fashion similar to the switch 64. This liquid level switch 70 is also normally closed in the absence of liquid at the point at which it is monitoring.

The above-described system functions to compensate for leakage of liquid as follows. If the level of liquid in the receiver 18 drops to a point corresponding to the monitoring point of the liquid level switch 64 through migration of liquid to cooler parts of the system, the switch 64 is closed thereby energizing the pump 38 which builds up pressure in the standpipe 42 until, at a preset pressure value, the relief valve 50 opens and passes liquid from the condenser collecting manifold 14 into the receiver 18. Such a drop of the liquid level in the receiver can occur when the condenser happens to be colder than the receiver, a situation which may occur when the power plant is shut down and the ambient air is blowing in a particular direction. The branch conduit 44 is of restricted size and fluid cannot be transmitted therethrough at a sufficient rate to prevent the above-mentioned pressure build up. The vapor generator feed control valve 20 is closed when the system is shut down and check valve 26 blocks flow toward the pump 20 so that the compensating system is essentially isolated from the main system during operation.

If the level of liquid in the vapor generator drops through liquid migration, the liquid level switch 70 in the vapor generator feed line 22 will sense this condition and energize the pump 38, simultaneously opening the solenoid valve 52 thereby pumping liquid into the boiler until the desired liquid level is reached. When the liquid level has passed the monitoring point of the switch 70, the switch will open, closing the valve 52 and deenergizing the pump 38.

As has been set forth in greater detail in applicant's copending application Ser. No. 427,369, some components of the system incorporating certain devices, require a supply of pressurized system fluid to operate the bearings and other features thereof. This pressurized fluid can be provided by the auxiliary pump 38 as an adjunct to the aforedescribed compensating system. This is achieved in the case of the pump 20 through the provision of branch conduit 44 and other fluid connections more particularly described in the last-mentioned copending application. In the pump, it is necessary that the bearings thereof be prepressurized prior to buildup of the main system pressure. This prepressurization is achieved as follows: When the ignition switch 60 is closed, the pump 38 is energized through the conductor 54, the pressure differential switch 56 being closed since the main pump 20 is not energized and producing a pressured differential. Activation of the standby pump 38 again builds up pressure in the standpipe 42 and transmits pressure to the bearings through the branch conduit 44 at a pressure value below that which opens the pressure release valve 50, which pressure is sufficient to provide the necessary prepressurization of the bearings in the main pump 20. As the main pump 20 is actuated, a pressure differential is built up between the intake and exhaust thereof, thereby opening the pressure differential switch 56 and deenergizing the pump 38 for the remainder of operation of the main power plant system. During this prepressurization period, the main vapor generator feed line 22 is also supplied with pressurized fluid through the branch conduit 46 to insure sufficient supply to the boiler until the main pump 20 takes over. The amount of fluid fed into the boiler is controlled through a main vapor generator control (not shown) which operates the vapor generator feed control valve 24.

A supply line or conduit 74 extends from the vapor generator exhaust to the housing of the pump 20 to supply vapor thereto and a scavange line or conduit 76 extends from the housing of the pump 20 to the top of the condenser 12 to supply and scavange vapor and liquid to and from the pump 20 in accordance with particular pump requirements described in greater detail in applicant's last-mentioned copending application.

The foregoing description is intended as exemplary of an embodiment incorporating features of the invention to enable those skilled in the art in the practice thereof. What has been set forth is therefore not intended to be restrictive and may, within the scope of the appended claims, be practiced otherwise than as specifically described.

What is new and intended to be protected by Letters Patent of the United States is:

1. A vaporized fluid power system comprising in series; a vapor generator;
a fluid motor connected to said generator for extracting mechanical energy from the vapor output thereof;
a condenser for receiving and condensing the vapor therefrom comprising at least one substantially vertically disposed condensing tube connected at the upper end thereof to the vapor exhaust from said motor;
a subcooler for transmitting and subcooling the condensate from said condenser comprising at least one substantially vertically disposed subcooling tube and means providing fluid communication between the lower end of said subcooling tube and the lower end of said condensing tube;
and means sequentially directing cooling air in heat exchange relationship over said subcooler and said condenser so that vapor is condensed in said condenser and the liquid condensate is subcooled in said subcooler at relative pressures such that a pressure gradient is imposed in the fluid of sufficient magnitude to cause said condensate to flow upwardly in said subcooler against the adverse static head conditions imposed thereon by gravity;
a liquid reservoir in communication with the upper end of said subcooler to receive and store condensate therefrom;
a fluid pump disposed proximate the lower end of said reservoir, the inlet of said pump being in communication with the lower end of said reservoir, the static head provided by the fluid stored in said reservoir being such that cavitation and vapor flash of fluid in the inlet of said pump is prevented;
and means to selectively transmit fluid from the outlet of said pump to said vapor generator for vaporization therein;
and means to compensate for fluid thermal migration in the system during system inactivity.

2. A vaporized fluid power system in accordance with claim 1 wherein said means to compensate for fluid thermal migration during system inactivity comprises a check valve in the outlet of said pump to block fluid flow therefrom into said pump, first bypass means between the lower portion of said condenser and said reservoir, an auxiliary pump disposed in said first bypass means below the level of said reservoir and said condenser, a pressure-actuated valve in said first bypass means between said auxiliary pump and said reservoir to block fluid flow therebetween when the pressure level in said bypass means is below a predetermined value, a first liquid level sensing means in said reservoir, first means to activate said auxiliary pump on signal from said first sensing means when the fluid level in said reservoir has dropped below a predetermined level to pump fluid from said condenser to said reservoir, second bypass means communicating with said first bypass means to connect said auxiliary pump with the fluid inlet to said vapor generator, valve means including actuating means in said second bypass means to normally block flow therebetween, a second liquid level sensing means in the inlet to said vapor generator, and a second means to activate said auxiliary pump and actuate said valve to an open condition on signal from said second sensing means when the level in the inlet to said vapor generator is below a predetermined level;

whereby decrease in the liquid level in said reservoir below a predetermined level will activate said auxiliary pump on signal from said first sensing means thereby supplying fluid through said first bypass means to said pressure-actuated valve until the pressure in said first bypass means is sufficient to open said valve and pass fluid into said reservoir, said fluid being passed until the liquid level in said reservoir has passed the predetermined level and whereupon is deactivated by termination of the signal from said first sensing means, and whereby decrease of liquid level in the inlet to said vapor generator below a predetermined level will activate said auxiliary pump and open said valve on signal from said second sensing means to supply liquid from said condenser to the inlet to said vapor generator until the liquid level therein is increased past a predetermined level whereupon said valve is closed and said auxiliary pump is deactivated upon termination of the signal from said second sensing means.

3. In a vaporized fluid power plant including an interconnected condenser, reservoir, fluid pump and a vapor generator, means to compensate for fluid thermal migration during system inactivity comprising a check valve in the outlet of said pump to block fluid flow therefrom into said pump, first bypass means between the lower portion of said condenser and said reservoir, an auxiliary pump disposed in said first bypass means below the level of said reservoir and said condenser, a pressure-actuated valve in said first bypass, means between said auxiliary pump and said reservoir to block fluid flow therebetween when the pressure level in said bypass means is below a predetermined value, a first liquid level sensing means in said reservoir, first means to activate said auxiliary pump on signal from said first sensing means when the fluid level in said reservoir has dropped below a predetermined level to pump fluid from said condenser to said reservoir, second bypass means communicating with said first bypass means to connect said auxiliary pump with the fluid inlet to said vapor generator, valve means including actuating means in said second bypass means to normally block flow therebetween, a second liquid level sensing means in the inlet to said vapor generator, and a second means to activate said auxiliary pump and actuate said valve to an open condition on signal from said second sensing means when the level in the inlet to said vapor generator is below a predetermined level;

whereby decrease in the liquid level in said reservoir below a predetermined level will activate said auxiliary pump on signal from said first sensing means thereby supplying fluid through said first bypass means to said pressure-actuated valve until the pressure in said first bypass means is sufficient to open said valve and pass fluid into said reservoir, said fluid being passed until the liquid level in said reservoir has passed the predetermined level and whereupon is deactivated by termination of the signal from said first sensing means, and whereby decrease of liquid level in the inlet to said vapor generator below a predetermined level will activate said auxiliary pump and open said valve on signal from said second sensing means to supply liquid from said condenser to the inlet to said vapor generator until the liquid level therein is increased past a predetermined level whereupon said valve is closed and said auxiliary pump is deactivated upon termination of the signal from said second sensing means.

4. In a system for condensing power plant exhaust from a vaporized fluid power plant, means for condensing and transmitting the condensed liquid against a static head adverse to gravity flow in the system comprising:
 a condenser for receiving and condensing system fluid in the vapor state comprising:
  at least one substantially vertically disposed condensing tube connected at the upper end thereof to exhaust from the fluid power plant;
 a subcooler for transmitting and subcooling the condensate from said condenser comprising:
  at least one substantially vertically disposed subcooling tube;
  means to provide communication between the lower end of said subcooling tube and the lower end of said condensing tube;
 and means to sequentially direct cooling air in heat exchange relationship over said subcooler and said condenser so that vapor is condensed in said condenser and the liquid condensate is subcooled in said subcooler at relative pressures such that a pressure gradient is imposed in the fluid of sufficient magnitude to cause said liquid to flow upwardly in said subcooler against the adverse static head conditions imposed thereon by gravity.

5. In a system for condensing exhaust vapor from a vaporized fluid power plant, means for condensing the vapor and transmitting the condensate against a static head adverse to gravity flow in the system comprising:
 a liquid reservoir for storing the condensate from said system;
 a condenser for receiving and condensing system vapor comprising:
  a horizontally disposed manifold;
  at least one substantially vertically disposed condensing tube communicating at the lower end thereof with said manifold and at the upper end thereof with the vapor exhaust from said power plant;
 a subcooler for transmitting and subcooling the condensate from said condenser comprising:
  at least one substantially vertically disposed subcooling tube communicating at the lower end thereof with said manifold and at the upper end thereof with said reservoir;
 and means to sequentially direct cooling air in heat exchange relationship over said subcooler and said condenser so that the vapor is condensed in said condenser and the liquid condensate is subcooled in said subcooler at relative pressures such that a pressure gradient is imposed in the fluid of sufficient magnitude to cause said condensate to flow through said subcooler into said reservoir against the adverse static head conditions imposed thereon by gravity.

References Cited by the Examiner

UNITED STATES PATENTS 3,009,325  11/1961  Pirsh _____ 60—105

EDGAR W. GEOGHEGAN, *Primary Examiner.*